United States Patent [19]
Dooley

[11] 3,827,309
[45] Aug. 6, 1974

[54] MANIPULATING MECHANISM
[76] Inventor: Richard A. Dooley, 400 S. Westwood Ave., Toledo, Ohio 43609
[22] Filed: Mar. 14, 1973
[21] Appl. No.: 341,133

[52] U.S. Cl. .................................. 74/110, 198/131
[51] Int. Cl. ............................................. F16h 21/44
[58] Field of Search .......... 74/110, 29; 198/131, 177

[56] References Cited
UNITED STATES PATENTS
| | | | |
|---|---|---|---|
| 2,640,584 | 6/1953 | Robb et al. | 198/131 |
| 3,367,578 | 2/1968 | Juvinall et al. | 198/177 |
| 3,475,973 | 11/1969 | Blazek et al. | 74/29 |
| 3,665,771 | 5/1972 | Blatt | 74/29 |

Primary Examiner—Samuel Scott
Assistant Examiner—Wesley S. Ratliff, Jr.
Attorney, Agent, or Firm—Allen D. Gutchess, Jr.

[57] ABSTRACT
Apparatus for manipulating a tool through predetermined motions is provided. The apparatus includes a rectangular frame with mutually perpendicular supporting rods extending between opposite frame members. A mounting carriage is slidably mounted on crossing portions of the rods with the tool, e.g., a spray gun, mounted thereon. A conveyor carrying products to be painted is located adjacent the frame with the spray gun automatically painting the products carried on the conveyor. Rack and pinion mechanisms are carried by the frame members for independently moving the two supporting rods in mutually perpendicular directions so that the spray gun on the carriage can be manipulated in any predetermined pattern. The rack and pinion mechanisms are operated through hydraulic boosters by flexible cables. The cables, in turn, are controlled through additional rack and pinion mechanisms of which movable racks are controlled through cam and follower mechanism. The stationary rack of one of the latter rack and pinion mechanisms can be moved in accordance with the conveyor speed to coordinate movement of the spray gun with movement of the products on the conveyor.

34 Claims, 13 Drawing Figures

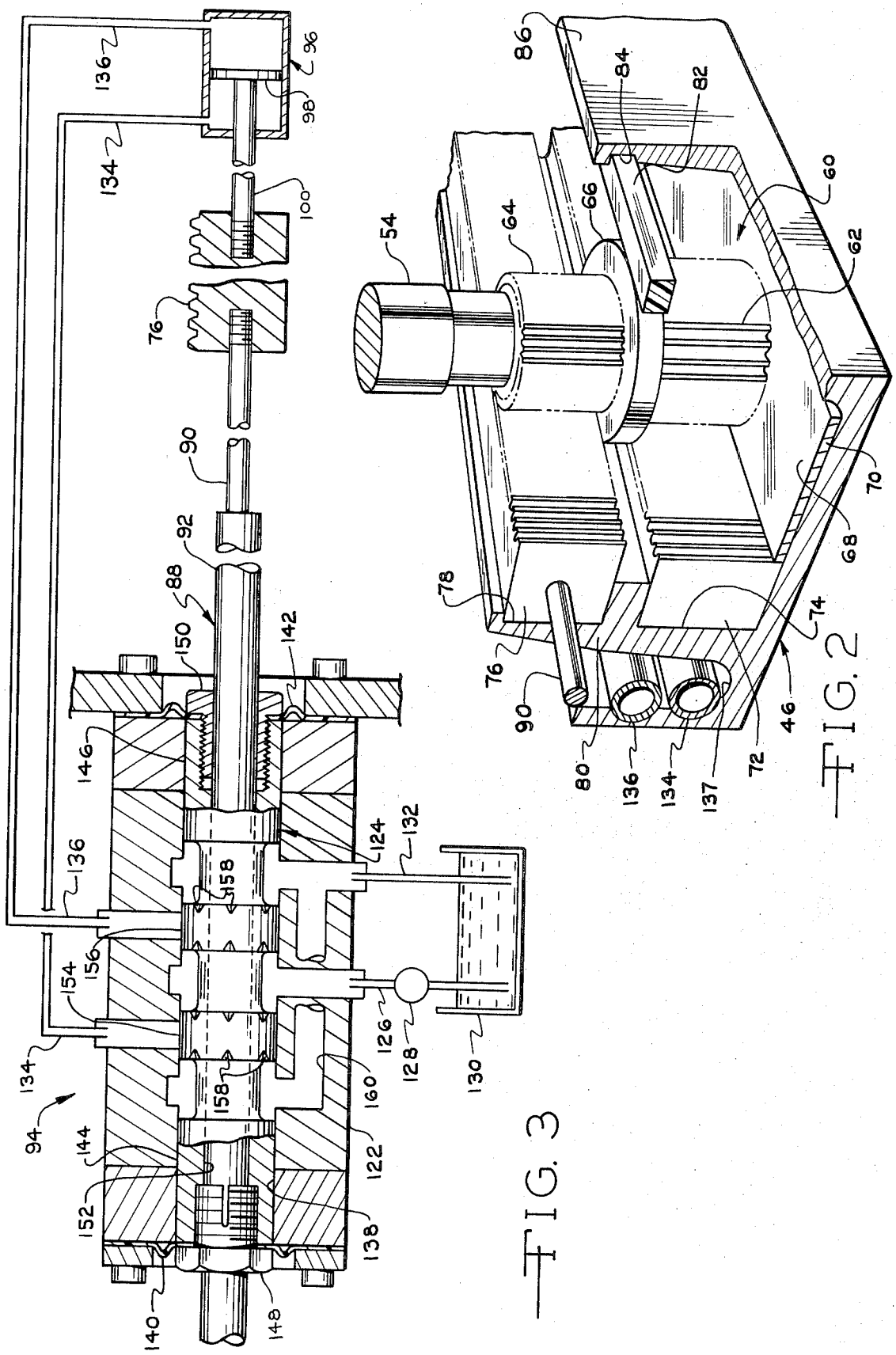

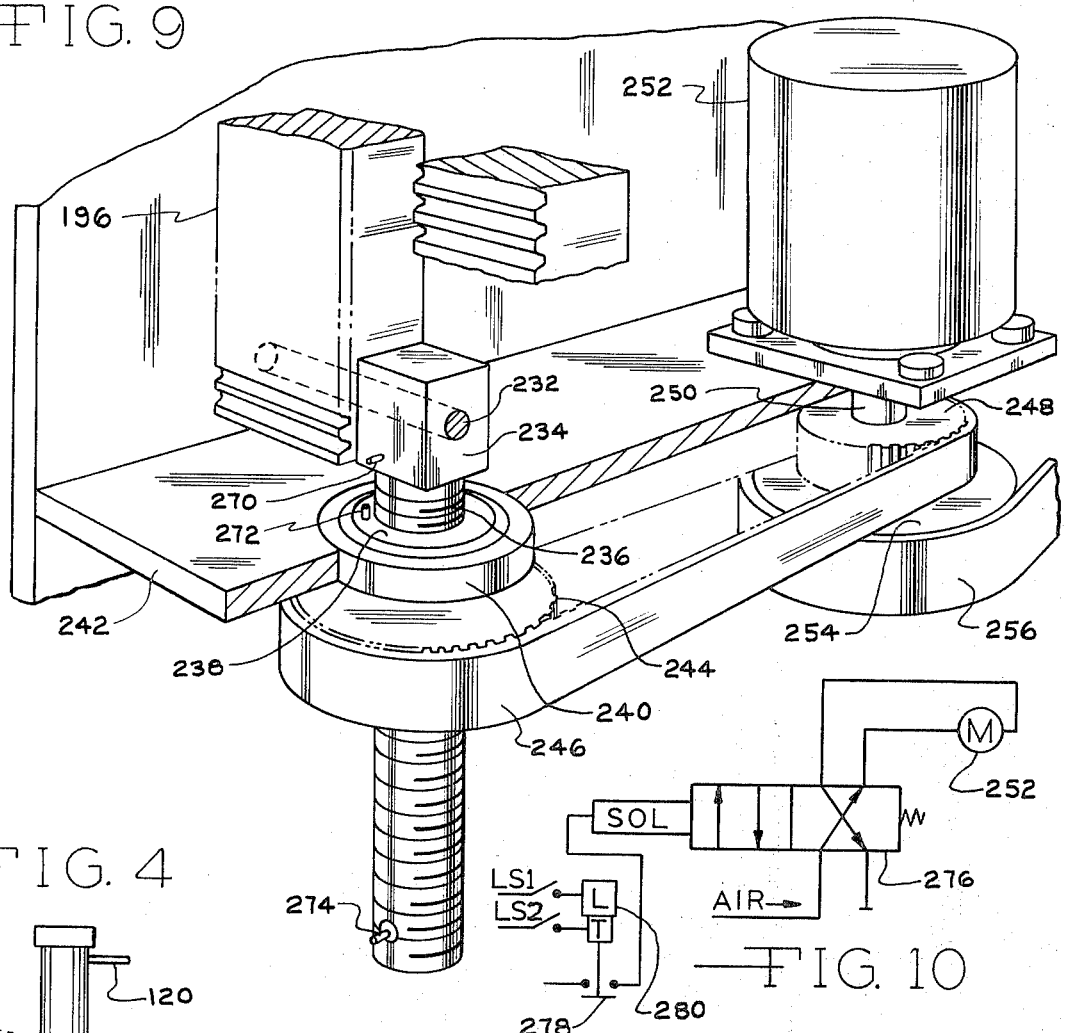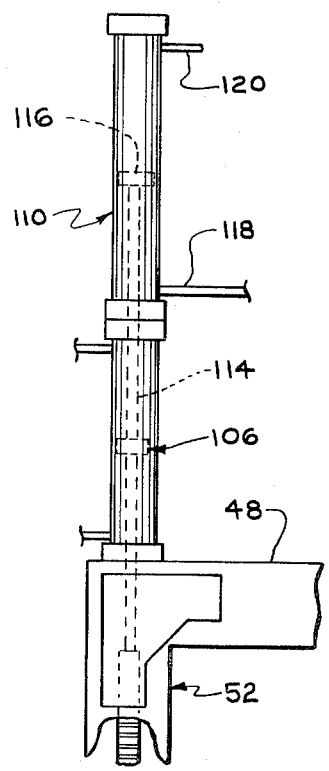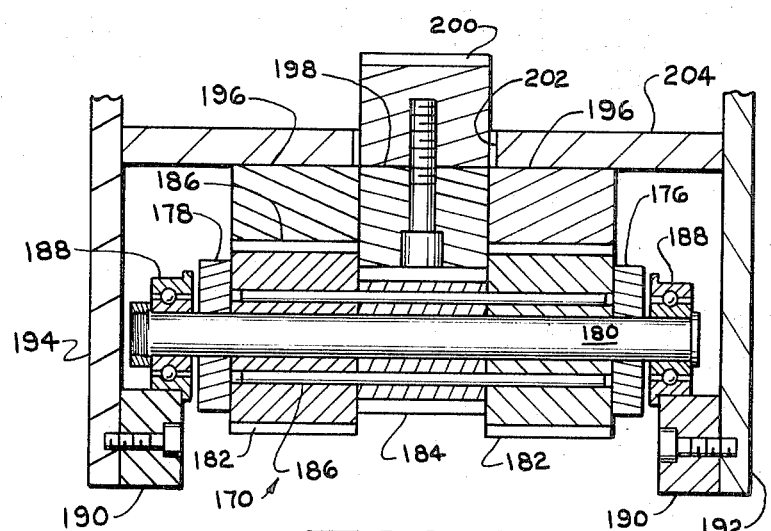

MANIPULATING MECHANISM

This invention relates to apparatus for manipulating an object and more particularly for moving a tool through predetermined motions automatically from a remote location.

The apparatus in accordance with the invention has many potential applications. A common one is to perform operations automatically on bodies or workpieces moving along a conveyor. Accordingly, an object or tool is manipulated in predetermined motions in a plane parallel to the conveyor along which the workpieces are carried. In a particular example, the tool can be a spray gun located in a spray booth through which workpieces to be painted pass in a predetermined path. The spray gun is controlled automatically through predetermined motions relative to the workpieces to paint them without the use of an operator at all. Further, the spray painting can be accomplished faster and more accurately than when the spray gun is manually controlled.

More specifically, the apparatus according to the invention includes a rectangular frame having parallel opposite frame members with a carriage on which the tool is mounted being manipulated within the area of the frame and in paths parallel to the plane of the frame. Mutually perpendicular, elongate supporting members extend between opposite frame members with the object or tool to be manipulated being mounted on the carriage which is slidably supported on both of said elongate members at portions where they cross. The elongate supporting members are moved transversely, in paths parallel to the frame members between which they extend, by mechanisms located in the frame members. Each of the mechanisms includes a unique rack and pinion arrangement comprising a movable rack, a parallel stationary rack, and two pinions, with different numbers of teeth, engaging the racks and rotatably carried by the elongate supporting members to move with them. This particular mechanism provides a fast motion for the elongate supporting members across the frame, similar to that which could be achieved by the use of fluid-operated cylinders having piston rods connected to the supporting members. At the same time, this mechanism provides the accuracy of screw jacks, insofar as the ability to accurately position the elongate supporting members and specifically their point of crossing in the framework is concerned.

The movable racks of the aforesaid mechanism are moved through predetermined motions and sequences by automatic control means which is remotely located, in order to move the carriage through predetermined motions and sequences. By so controlling both of the elongate supporting members, substantially unlimited motion of the carriage in the area of the frame can be achieved.

The movable racks can be moved by flexible cables having cores with ends connected to ends of the movable racks, with the cables extending to a remote location where the cores, in turn, are moved through predetermined motions. In a preferred form, each of the opposite or remote ends of the cables has the core connected to pinions which are engageable with a movable control rack and a stationary control rack, with the movable control rack moved longitudinally in a predetermined motion to correspondingly move the associated pinion and the cable core connected thereto. These movable control racks are moved by automatic programming means, such as cam members, which drive the movable racks through predetermined motions in predetermined cycles. Thus, the cam members are driven to move the movable control gear racks which move the corresponding pinions to longitudinally move the cable cores, which longitudinally move the movable controlled gear racks of the frame members. These correspondingly move the elongate supporting members which cause the carriage at the cross over portions to move through predetermined paths parallel to the plane of the frame.

Where a tool such as a spray gun is mounted on the carriage to perform an operation such as spraying objects moved past the frame on a conveyor, means can be provided to control the elongate supporting member which moves parallel to the workpiece at a speed equal to the speed of the workpiece. This is accomplished through mechanism which is driven by a component of the conveyor at a speed corresponding thereto and which, in turn, moves the stationary control rack in a manner to impart movement to the movable gear rack of the aforesaid elongate supporting member at a speed equal to the workpiece. The spray gun and the workpiece thus move along together, each being stationary relative to the other. Additional movement desired in the direction parallel to the object is imparted through the cam which operates the movable control gear rack for that elongate supporting member. The latter movement thus is superimposed on the otherwise steady movement of the elongate supporting member achieved by the movement of the stationary control gear rack.

It is, therefore, a principal object of the invention to provide apparatus for manipulating an object in a predetermined path.

Another object of the invention is to provide apparatus for moving a tool through a predetermined path relative to a workpiece on which the tool is to operate.

Still another object of the invention is to provide a carriage on which a spray gun is mounted, which carriage moves in a predetermined path relative to a workpiece to be coated, without the use of an operator.

Yet another object of the invention is to provide apparatus for coating a workpiece more uniformly and accurately by automatic, remotely controlled mechanism.

A further object of the invention is to provide apparatus for moving a carriage in a path parallel to a framework in which the carriage is movably mounted through mutually perpendicular, elongate supporting members.

Yet a further object of the invention is to provide apparatus for moving an object through predetermined paths in an area of a frame with mechanism which is both faster and more accurate than mechanisms heretofore known.

Still a further object of the invention is to provide mechanism for moving a tool in paths parallel to a conveyor line with means for automatically coordinating the movement of the tool relative to the movement of the workpiece on the conveyor line.

Many other objects and advantages of the invention will be apparent from the following detailed description of preferred embodiments thereof, reference being made to the accompanying drawings, in which:

FIG. 2 is an enlarged view in perspective, with parts broken away and with parts in section, of drive mechanism employed in a frame of FIG. 1 showing the area outlined by dotted lines DL in FIG. 1;

FIG. 3 is a somewhat schematic, fragmentary view in longitudinal section of a hydraulic booster system used with the mechanism of FIG. 2;

FIG. 4 is a schematic view in elevation of modified hydraulic mechanism used with drive mechanism in the vertical frame members of FIG. 1;

FIG. 8 is an enlarged view in transverse cross section taken along the line 8—8 of FIG. 6;

FIG. 9 is a somewhat schematic view in perspective of apparatus for coordinating the horizontal motion of the vertical elongate supporting member of FIG. 1 with the movement of the workpiece along the conveyor line;

FIG. 10 is a diagrammatic view of controls for the mechanism of FIG. 9;

Figure 1:
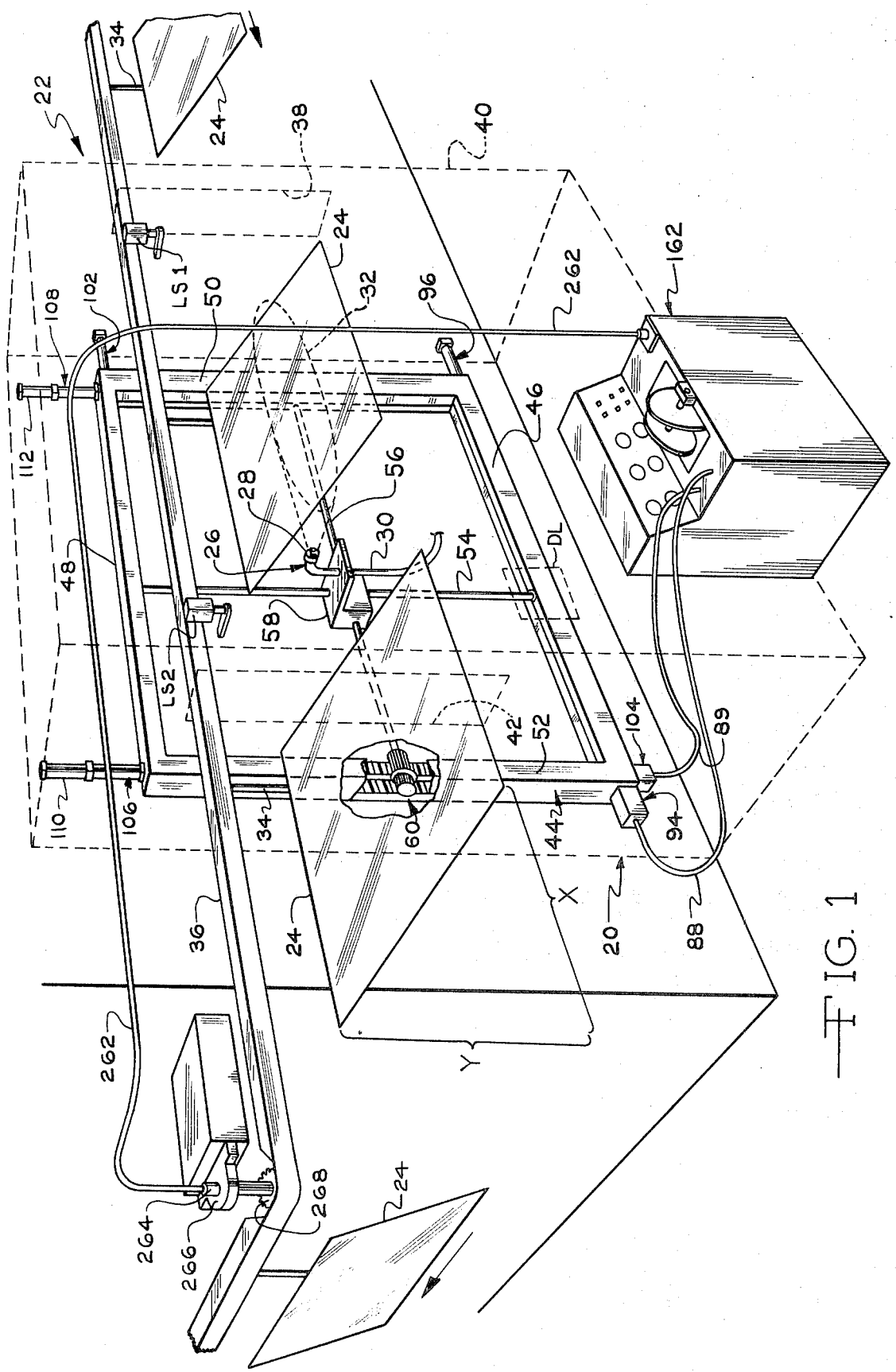
FIG. 1 is a somewhat schematic view in perspective, with parts broken away, of overall apparatus in accordance with the invention.

Referring to the drawings and particularly to FIG. 1, manipulating mechanism according to the invention is indicated generally at 20 and is shown with a conveyor indicated at 22 along which workpieces or plates 24 are moved in the direction of the arrows. A tool indicated at 26 is used to perform operations on the workpieces 24 moving along the conveyor line 22. Specifically, the tool or object 26 is illustrated as a spray gun or head 28 to which coating material can be supplied through a suitable, flexible line 30.

The workpieces or objects 24 are shown as plates having the shapes of parallelograms or rhomboids. In this instance, an elliptical spray pattern indicated at 32 has a horizontal disposition with a length equal to the width of the plate 24. The plate 24 can then be coated by a single pass of the spray head 28 in a diagonally forward and upward direction. To accomplish this, the spray head 28 must move horizontally relative to the plate 24 a distance X in FIG. 1 which equals the horizontal displacement of either pair of upper and lower corners of the plate. At the same time, the spray head must move vertically a distance equal to the distance Y, representing the height of the plate. In addition, with the plate 24 moving along the conveyor line 22, the spray head must also have a horizontal motion equal to that of the plate in addition to the distance X. This will be discussed more fully subsequently.

The conveyor 22 includes hangers 34 which support the plates 24 and are suspended from chains (not shown) mounted for longitudinal movement within a conveyor rail 36. The conveyor 22 can carry the plates 24 through an entrance opening indicated by dotted lines 38 of a spray booth indicated by dotted lines 40 and out an exit opening indicated by dotted lines 42 of the spray booth. The spray booth 40 can be of a substantially conventional design, having the usual exhaust system and other elements.

The manipulating mechanism according to the invention includes a rectangular frame indicated at 44 having a pair of spaced, parallel lower and upper frame members 46 and 48 and a pair of spaced, parallel vertical frame members 50 and 52. A vertically-disposed, elongate supporting member or rod 54 extends between the lower and the upper frame members 46 and 48 and is mounted for transverse movement in directions parallel to the frame members 46 and 48 to supply the X motion for the tool 26. A horizontally disposed, elongate supporting member or rod 56, perpendicular to the first, extends between the vertical frame members 50 and 52 and is mounted for transverse movement in a direction parallel to the vertical frame members 50 and 52, to supply the Y motion for the tool 26. Accordian-type bellows can be employed on both of the elongate supporting members 54 and 56 to keep them clean and prevent paint or other contaminants from being deposited thereon.

The tool 26 is actually mounted on a carriage or mounting means 58 which is slidably carried on crossing portions of both of the supporting members 54 and 56, with the motion of the carriage 58 being a composite of the straight motions of the supporting members 54 and 56. By appropriate movement of the members 54 and 56, the carriage 58 can be moved through any path within a plane parallel to the frame members and within the area or space defined by the frame 44. The frame 44 should be of a size to enable the spray head 26 to cover any workpiece within reason which can be carried by the conveyor 22, with the plane of the frame being parallel to the path of movement of the workpieces 24.

The elongate supporting members 54 and 56 are moved in their respective frame members by moving means in the form of rack and pinion mechanisms as indicated at 60 in FIGS. 1 and 2. In FIG. 2 the mechanism is shown within the lower frame member 46 and is connected with the elongate supporting member 54 to move it in its transverse path parallel to the frame members 46 and 48. A similar rack and pinion mechanism preferably is located at the upper end of the elongate supporting member 54 in the upper frame member 48, with both being operated for synchronized movement. This minimizes the torque on the supporting member 54 and enables more accurate positioning of the carriage 58 in the X motion. The mechanism 60 includes a large pinion gear 62 and a small pinion gear 64 which are affixed to one another and are also affixed on the end of the supporting member 54 which thereby serves as a torsion member between the gear sets of both ends. A bearing disc 66 is located between the pinion gears 62 and 64. Also, the lower end of the pinion gear 62 can be partially supported on a bearing strip 68 located in a lower channel 70 of the frame member 46. The larger pinion gear 62 meshes with a stationary gear rack 72, in this instance, which is affixed in a lower side channel 74 of the frame member 46. The smaller pinion gear 64 meshes with a movable gear rack 76 located in an upper side channel 78 of the frame member 46. The gear and rack teeth can be of other designs, such as helical or herringbone, for smoother and quieter operation. The bearing disc 66 extends between the racks near a dividing partition 80 of the member 46 while the opposite edge of the bearing disc 66 bears against a pressure bar 82 held in a groove 84 of a front wall 86 of the frame member 46. The cooperation of the bearing disc 66 with the pressure bar 82 assures that the pinion gears 62 and 64 will remain in mesh with their respective gear racks 72 and 76.

With this arrangement of the gear racks and pinion gears, a relatively small movement of the movable gear rack 76 will result in a relatively large movement of the pinion gears 62 and 64, along with the supporting member 54, in the same direction. By way of a specific example, with the larger pinion gear 62 having 16 teeth and the smaller pinion gear 64 having 14 teeth, a 1-foot movement of the movable gear rack 76 will result in an 8-foot movement for the pinion gears 62 and 64 and the supporting member 54.

This arrangement of the mechanism 60 enables the supporting members 54 and 56 to be moved with substantial speed across the frame 44 yet the rack and gear arrangement also enables precise movement of the supporting members 54 and 56. Consequently, the mechanism enables the supporting members 54 and 56 to have a speed equivalent to that which might be obtained if the members were moved by pneumatic cylinders, for example. At the same time, the precision of the motion of the supporting members 54 and 56 can substantially equal that which is obtained with the use of screw jacks or similar gear mechanisms.

For smaller frames and ample external room, the ratio could be revised, with the number of teeth on the smaller pinion gear meshing with the movable rack being reduced so that a given movement of the movable rack results in a smaller movement of the pinion gears, thereby providing a larger mechanical advantage to enable the movable gear rack to be moved more easily.

The motions of the movable racks 76 are remotely controlled through flexible cables 88 and 89 (FIG. 1) with the cable 88 controlling the movable racks 76 for the elongate supporting member 54 and the cable 89 controlling movement of the movable racks 76 for the elongate supporting member 56. With the ratio of the pinion gears 62 and 64 discussed above, and with the 1-foot movement of the movable rack resulting in an 8-foot movement of the pinions and elongate supporting member, it is desirable to have a booster employed with the flexible cables to aid in the movement of the movable racks.

Referring to FIG. 3, the flexible cable 88 has a center core or rod 90 affixed to one end of the movable rack 76 and has an outer sheath 92 which extends through a spool valve 94. The spool valve 94, in turn, controls a hydraulic cylinder 96 located at the opposite end of the frame member 46 and which has a piston 98 with a piston rod 100 connected to the end of the movable rack 76 opposite the cable core 90. The one valve 94 controls fluid to both the cylinder 96 and an upper cylinder 102 for the movable gear rack in the upper frame member 48. Similarly, a spool valve 104 controls hydraulic cylinders 106 and 108 for the movable gear racks in the vertical frame members 50 and 52. The hydraulic cylinders 106 and 108 are similar to the cylinders 96 and 102 except that they have balancing cylinders 110 and 112 mounted thereon, with each of the cylinders 96 and 102 having a piston rod 114 (FIG. 4) extending completely therethrough and to a piston in each of the cylinders 110 and 112. Fluid under pressure is supplied to the rod end of each of the balancing cylinders through a line 118 and a vent line 120 communicates with the blind end of each of the balancing cylinders 110 to urge the piston 116 upwardly for the purpose of balancing the weight of the vertically disposed, movable gear rack 76 in each of the frame members 50 and 52 and the components engageable with the movable gear racks. With the balancing cylinders 110 and 112, the hydraulic cylinders 106 and 108 function in the same manner as the hydraulic cylinders 96 and 102 which operate the horizontally disposed movable gear racks in which the weight is not a factor.

Referring now more particularly to FIG. 3, the valve 94 includes a valve body 122 and a valve spool 124. Fluid and specifically hydraulic fluid is supplied to the valve from a supply line 126 by a pump 128 which can be of a commercially available, pressure-compensated, variable-volume hydraulic type. The volume output of this pump drops to zero as the output pressure builds up to a predetermined value. The hydraulic fluid is supplied from a reservoir 130 with fluid returned to the reservoir through a return line 132. From the valve, a line 134 communicates with the rod end of the cylinder 96 and a line 136 communicates with the blind end of the cylinder, these being located in a channel 137 of FIG. 2. The spool 124 is slidably movable in a main bore 138 of the valve body 122 with the ends sealed off by diaphragms 140 and 142 which prevent hydraulic fluid from leaking from the valve body and yet enable longitudinal movement of the spool 124 within the valve body bore 138. The spool 124 has end enlargements 144 and 146 which threadedly receive hollow bolts 148 and 150 which connect the spool to the diaphragms 140 and 142. The threaded bolts also help affix the flexible cable sheath 92 in a central inner bore 152 so that the spool and sheath move together longitudinally as a unit. The spool 24 further has two enlarged cylindrical sections 154 and 156 each having triangular metering notches 158 to provide a smoother flow of fluid through the valve with the cylindrical sections 154 and 156 blocking the lines. If the valve spool 124 is now moved to the left, the supply line 126 will communicate with the line 134 to supply fluid to the rod end of the cylinder 96. At the same time, the line 132 communicates with the line 136 to exhaust fluid back to the reservoir 130 from the blind end of the cylinder 96. Oppositely, when the valve spool 124 is moved to the right from the position shown in FIG. 3, the line 126 will communicate with the line 136 to supply fluid to the blind end of the cylinder. The line 132 will now communicate with the line 134 through a branch line 160 to return fluid from the rod end of the cylinder through the line 134, the branch line 160, and the line 132 to the reservoir 130.

The operation of the valve 94 in connection with the flexible cable 88 will now be described. If it is desired to move the elongate supporting member 54 toward the left, the remote end of the cable core 90 is pulled to urge the core 90 and the movable rack 76 toward the left. This pull places the opposite reaction on the cable sheath 92, tending to move it toward the right and similarly causing the spool 124 to which it is connected to move toward the right. With this movement of the spool toward the right, the hydraulic fluid is supplied to the blind end of the cylinder and exhausted from the rod end so that the fluid pressure in the cylinder 96 causes the piston 98 and the piston rod 100 to move toward the left and similarly move the movable rack 76. Movement of the movable rack 76 toward the left causes the pinions 62 and 64 to move in the same direction along with the elongate supporting member 54. However, as the movable rack 76 moves toward the left, the tendency for the sheath 92 to be urged toward the right is relieved and the spool 124 will tend to be moved back to its neutral position since the core 90 and the sheath 92 tend to be moved toward the left through the movement of the movable rack 76. The movable gear rack 76 moves a maximum of about 1/8 inch in this specific embodiment, after the pulling force is stopped on the core 90, the 1/8 inch being sufficient to return the spool 124 from its maximum right hand position back to the neutral position shown. However, as long as the core 90 continues to be pulled, the unbalanced forces will remain, and the rack 76 and the supporting member 54 will continue to move toward the left until the pulling force ceases.

In a similar manner, when it is desired to move the supporting member 54 toward the right, the remote end of the core 90 is pushed, which tends to push the rack 76 toward the right and the opposite reaction tends to move the flexible sheath 92 toward the left, along with the spool 124. The fluid is then supplied through the line 134 to the rod end of the cylinder 96 and exhausted through the line 136 from the blind end. This pressure then moves the rack 76 toward the right and relieves the force on the sheath 92 so that further movement of the rack 76 toward the right moves the spool 124 back to neutral. The movement will continue toward the right as long as the force continues to be exerted on the core 90 to produce the reactive force toward the left on the sheath 92, with the corresponding movement of the core 124.

The fluid is actually supplied to and exhausted from the cylinder 102 (FIG. 1) simultaneously with the cylinder 96 so that both movable racks 76 in both of the frame members 46 and 48 are moved simultaneously. Also, the movable gear racks 76 in the vertical frame members 50 and 52 are controlled through the cylinders 106 and 108 by the valve 104 through the sheath of the flexible cable 89. If the mechanical advantage is sufficient or if the structure is sufficiently small or light, the flexible cables can be used to directly control the movable gear racks 76 without the need for the hydraulic boosters.

The cores of the flexible cables 88 and 89 can be controlled from a remote position by a number of different mechanisms or systems. A preferred manner of controlling the cable core, however, is shown particularly in FIGS. 5–8. A control cabinet 162 has a top 164 in which are affixed the remote ends of the sheath 92 of the flexible cable 88 and a sheath 166 of the flexible cable 89. The core 90 of the cable 88 and a core 168 of the cable 89 extend through the top 164 and into the cabinet. The core 90 is moved through predetermined motions by mechanism indicated at 170 and the core 168 is moved through predetermined motions by mechanism 172. The mechanisms 170 and 172 are basically the same and only the mechanism 170 will be described in detail. Accordingly, the core 90 is affixed in a yoke 174 having arms 176 and 178 (see also FIG. 8) rotatably mounted on a rod or axle 180. Large pinion gears 182 are rotatably mounted on the axle 180 and a small pinion gear 184 is rotatably mounted on the axle between the larger ones. The three pinion gears are pinned to rotate together by pins 186. Bearings 188 are mounted on the ends of the axle 180 with outer races thereof bearing against back-up bars 190 which are suitably affixed to partitions or walls 192 and 194 of the cabinet 162. The cooperation of the bearings 188 and the back-up bars 190 assure that the large pinion gears 182 and the small pinion gear 184 remain in mesh with gear racks 196 and 198, respectively.

The cooperation of the small pinion gear 184 and the movable rack 198 in conjunction with the larger pinion gears 182 and the gear racks 196 function similarly to the small pinion gears 64 and the movable rack 76 with the larger pinion gear 62 and the stationary rack 72. The use of the two larger pinion gears 182 and their two corresponding racks 196 is only for purposes of balance, with one of the larger pinion gears and corresponding rack being sufficient from a functional standpoint. When the movable gear rack 198 is moved, it causes the pinion gears 184 and 182 to move a longer distance in the same direction, similarly to movement of the movable gear racks 76 causing movement of the pinion gears 62 and 64 a longer distance in the same direction. The extent of the relative movement of the movable gear rack 198 compared to the pinion gears again depends on the relative number of teeth on the pinion gears. In this particular instance, a 6:1 ratio is provided so that a 1-inch movement of the movable gear rack 198 causes a 6-inch movement of the pinion gears 182 and 184.

By way of illustration, when the movable gear rack 198 moves upwardly, the pinion gears similarly move upwardly and move the core 90 upwardly, with the opposite end of the core 90 tending to push the gear rack 76. Here the reaction on the cable sheath 92 causes the valve spool 124 to move in the opposite direction, causing fluid to be supplied to the rod end of the cylinder 96 to cause the gear rack 76 to move toward the right and so move the elongate supporting member 54. Oppositely, downward movement of the gear rack 198 causes the pinions to pull on the core 90 and causes the elongate supporting member 54 to move toward the left.

The mechanism 172 for the flexible cable 89 to control movement of the horizontal elongate supporting member 56 operates in a similar manner. In this instance, downward movement of the movable gear rack of the mechanism 172 pulls on the core 168 and causes downward movement of the elongate flexible member 56. Oppositely, upward movement of the core 168 causes upward movement of the elongate supporting member 56.

Figures 5, 6:
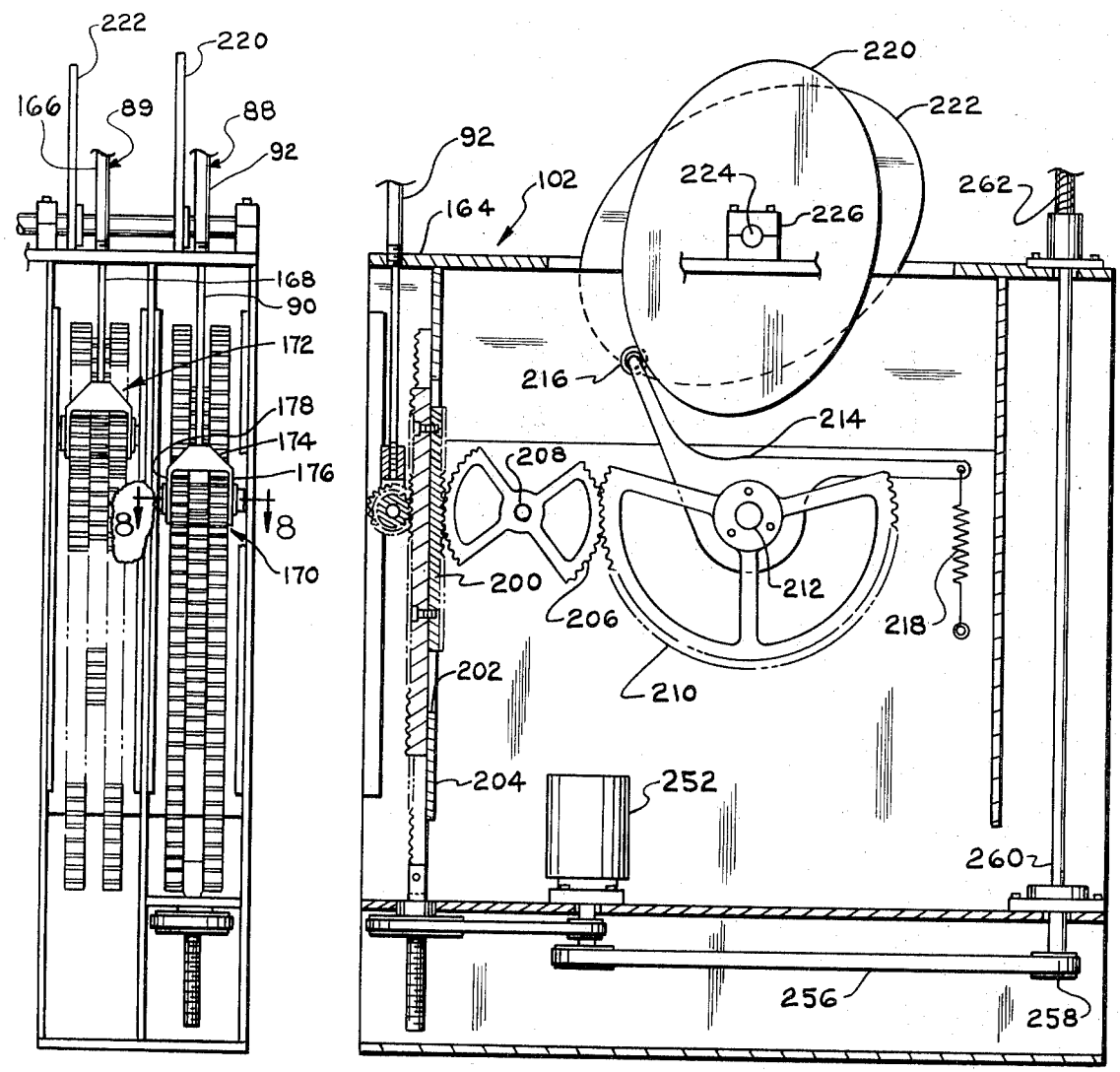
FIG. 5 is a somewhat schematic, fragmentary view in vertical section of a control cabinet shown in FIG. 1, with front and side panels removed.
FIG. 6 is a left side view in elevation of the control cabinet of FIG. 5.

The movable control gear racks 198 are, in turn, moved through predetermined motions to control the motion of the carriage 58. In this instance, a cam arrangement is employed to provide the desired motions. Accordingly, the movable gear racks 198 have rearwardly-extending gear racks 200 (FIGS. 5 and 8) affixed thereto and extending in the opposite direction through slots 202 in a supporting wall 204 of the cabinet 162. Gear sectors 206 suitably pivotally mounted on an axle 208 mesh with the gear racks 200. The gear sectors 206 also simultaneously mesh with main control gear sectors 210 pivotally mounted on an axle 212 which is suitably supported in the cabinet 162. Cam followers 214 are suitably affixed to the respective control gears 210 and are also pivotally mounted on the axle 212. Each of the cam followers 214 has a cam roller 216 at one end and a spring 218 at the other end, which urges the cam roller 216 against a control cam 220 or 222. The cams are pre-cut to particular shapes to provide the desired motion for the carriage 58 and the tool 26 mounted thereon in accordance with the shape and size of the workpieces being operated on. The cam 220 controls the X motion of the carriage 58 while the cam 222 simultaneously controls the Y motion of the carriage 58. The shapes of the cams shown in FIG. 5 are for illustrative purposes only and are not necessarily intended to represent a specific motion of the carriage 58, much less one which will provide the desired X and Y motions necessary to coat the plates 24.

Figure 7:
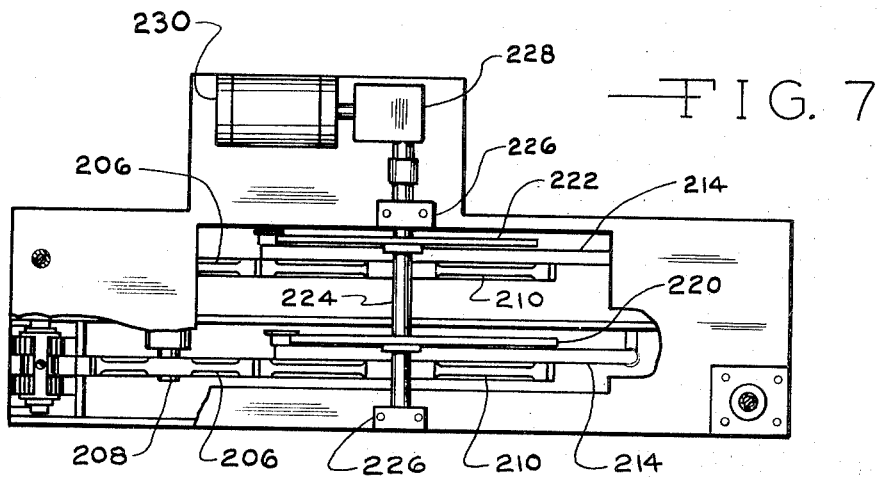
FIG. 7 is a top view of the control cabinet of FIG. 5.

As shown particularly in FIG. 7, the cams 220 and 222 are affixed to a shaft 224 which is rotatably supported in bearing blocks 226 mounted on the top 164 of the cabinet 162. The shaft 224 is driven through a reducer 228 by a motor 230. In a preferred form, the rotational speed of the shaft 224 is variable, as by employing a variable speed type for the motor 230 so that the speed of the shaft 224 can be varied by an additional coaxial cam and follower arrangement (not shown) as the cams 220 and 222 rotate. In this manner, the length of the cycle can be changed and the motion of the carriage 58 and the spray head 28 can be slowed down so that more paint can be sprayed on specific portions of the workpieces being coated, if desired. Hence, a tendency for the paint to be slightly thin in certain portions of the workpiece can be overcome by slowing down the rotation of the shaft 224 at the appropriate time during the cycle.

While the cams 220 and 222 provide the desired X-Y motion relative to the workpiece 24 when the workpiece is stationary, the X motion cam 220 can also be designed to provide an additional X motion for the carriage 58 which will correspond to the horizontal movement of the workpiece 24 along the conveyor line 22. However, if the horizontal movement of the workpiece 24 is increased or decreased, this cannot be accommodated by the X motion cam 220 without recutting the cam. While the speed of the motor 230 could be increased or decreased to accommodate the change in movement of the workpieces 24, this would also affect the outer X motions and also the Y motions of the carriage 58. Consequently, it is desirable to have an additional control for independently varying the X motion of the carriage 58 in accordance with the line speed of the workpieces.

To accomplish this, the so-called stationary racks 196 can actually be moved at a constant rate of speed corresponding to the speed of the conveyor line. The movement of the stationary racks 196 can then be used to impart a constant X motion to the carriage 58 which is independent of the X motion provided by the movable gear rack 198 driven by the cam 220. A constant upward motion of the gear racks 196 will impart a constant downward motion to the pinions 182 and 184, causing a constant movement of the elongate supporting member 54 toward the left. However, the X motion provided through the pinion 184 and the movable gear rack 198 will be superimposed on the constant motion provided by the stationary racks so that the position of the workpiece 24 relative to the spray head 28 will be the same insofar as the movable rack 198 is concerned, as if both the workpiece and spray head were stationary.

Referring to FIG. 9, to impart the constant motion to the gear racks 196, the lower ends are connected by a pin 232 and a block 234 to the upper end of a screw 236. The screw is engaged by a screw jack nut 238 which is rotatably mounted in a fixed position by means of a thrust bearing 240 affixed in a platform 242 within the cabinet 162. A timing pulley 244 has teeth engageable by a timing belt 246 having a drive pulley 248 spaced therefrom. The drive pulley 248 is mounted on a shaft 250 of an air motor 252. A commercially available, one-way clutch 254 is also located on the shaft 250 and is engaged with a belt 256 which can also be a timing belt and which is driven by a remote drive pulley 258 (FIG. 5). The pulley 258, in turn, is driven through a shaft 260 which is connected to a flexible shaft or cable 262. Referring to FIG. 1, the flexible shaft 262 extends to a remote location where it is connected to an end of a shaft 264 rotatably mounted in a bearing 266 and having a sprocket 268 at an end thereof. The sprocket 268 is driven by the conveyor chain (not shown) which is located in the conveyor rail 36 and which is engaged with the sprocket 268 as the chain turns the corner. The sprocket 268 thus drives the flexible shaft 262, the shaft 260, the drive pulley 258, the timing belt 256, and the one-way clutch 254 at a speed which is responsive to the speed of the workpieces along the conveyor line.

The operation of the conveyor synchronizing mechanism will now be described. The belt 256 drives the one-way clutch 254 in the slip direction so that the movement of the belt 256 alone has no effect on the motion of the racks 196. However, when the air motor 252 drives the shaft 250 in the same direction, it does so move the shaft, being affixed thereto. The shaft 250 can only move at a speed equal to the speed of the belt 256 since the one-way clutch will not permit the shaft 250 to rotate faster. Consequently, the air motor 252 constantly drives the shaft 250 but at a speed no faster than the belt 256. Hence, the pulley 244 is driven at a speed responsive to the belt 256 and the conveyor line and so moves the screw 236 in an upward direction. This moves the racks 196 at a constant upward speed and causes the pinions 182 and 184 to move downwardly at a speed responsive to the conveyor line speed.

When the air motor 252 is reversed, it drives the shaft 250 and the pulley 248 in the opposite direction at maximum speed, unrestricted by the belt 256 which continues to move the clutch in the same direction as previously. The clutch and conveyor now have no limiting effect on the shaft 250 being driven in the opposite direction so that the nut 238 is driven rapidly and quickly returns the screw 236 to the lower position, the lower position being determined by a stop pin 270 on the block 234 which strikes a stop pin 272 mounted on the screw jack nut 238. When these engage one another, the rotation of the nut is stopped as is the timing pulley 244 to which the nut is affixed. Hence, the lower position of the screw and the racks 196 is precisely determined by the engagement of the stop pins 270 and 272 to determine the exact right hand position of the elongate member 54. At this time, the air motor 252 simply stalls until it is reversed again, at which time it moves the screw in the opposite direction with the speed restrained by the belt 256. The maximum upward motion of the screw 236 is limited by a pin 274 at the lower end thereof.

To operate the air motor 252, a four-way valve 276 of FIG. 10 can be employed. The valve is electrically operated through a solenoid designed SOL with current to the solenoid controlled through switch contacts 278 and a latch-trip relay 280. A latch portion of the relay designated L is controlled by a limit switch LS1 and a trip portion of the relay designated T is controlled by a limit switch LS2. As shown in FIG. 1, the limit switch LS1 is located near the point where the workpiece 24 enters the area in front of the frame 44 in which the tool is to operate and the limit switch LS2 is located near the point where the workpiece exits from this area. The feeler arm of the limit switch LS1 is engaged by the hanger 34 or the workpiece 24, the hanger 34 in this instance, and it closes to energize the latch portion L of the latch trip relay 280. This pulls in the contacts 278 which energizes the solenoid SOL and moves the four-way valve 276 to the position in which the air motor 252 is driven forwardly. The motor then, through the drive shaft 250, the pulley 248, the timing belt 246, and the pulley 244, drives the screw 236 upwardly along with the racks 196 to move the pinions 182 and 184 and the flexible cable core 90 downwardly. This causes the supporting member 54 to move toward the left in an X motion having a speed equal to the speed of the workpiece 24. When the switch LS1 is energized, the tool 26 is positioned at a predetermined position relative to the workpiece by virtue of the stop pins 270 and 272, in this instance being such that the spray pattern 32 extends completely across the width of the workpiece 24 at the lower edge thereof. At this time, the limit switch LS1 can also operate the motor 230, if desired, to start rotation of the cams 220 and 222 and move the movable control gear racks 198 through their predetermined cycles to impose the X and Y motions on the tool 26 relative to the workpiece, independently of the X motion imparted to the tool relative to the conveyor line speed.

When the hanger or workpiece, the hanger 34 in this instance, contacts the feeler arm of the limit switch LS2, it energizes the trip portion of the relay 280, dropping out the contacts 278 and deenergizing the solenoid SOL. A spring at the opposite end of the four-way valve 276 returns the valve to the first position and drives the motor 252 in the opposite direction. The motor then quickly returns the screw 236 and the racks 196 back to the original position, as determined by the stop pins 270 and 272, rendering the tool and the carriage 58 ready for another workpiece, when the next one contacts the limit switch LS1. The motor 230 can be automatically shut off when the cams complete one revolution or cycle so that the cams remain stationary until the motor 230 is energized again by the limit switch LS1.

Figure 11:
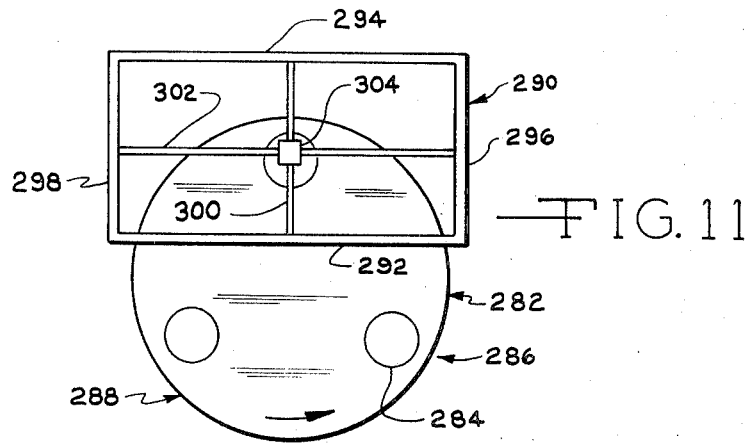
FIG. 11 is a schematic plan view of modified apparatus embodying the invention in which workpieces are moved in an arcuate rather than a lineal path.
Figure 12:
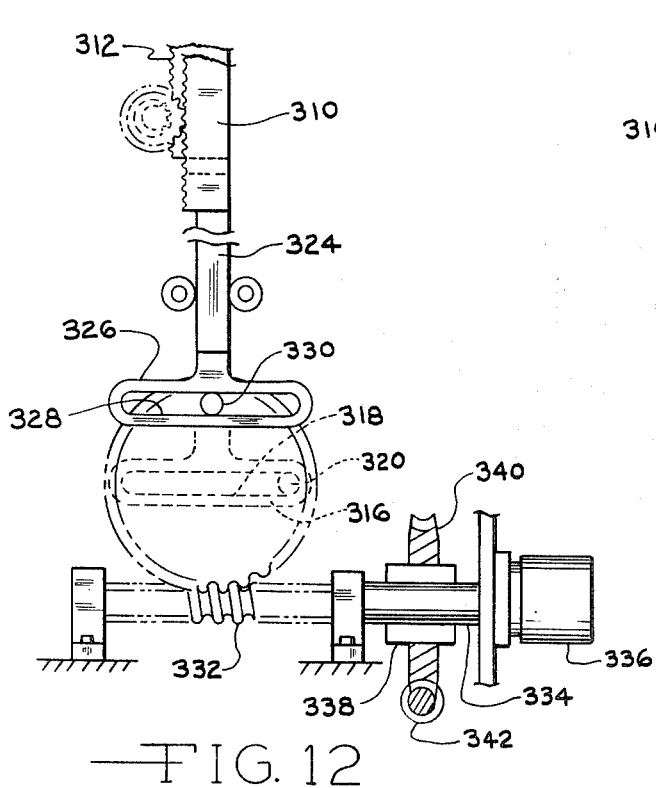
FIG. 12 is a schematic front view in elevation of a control mechanism used with the apparatus of FIG. 11.
Figure 13:
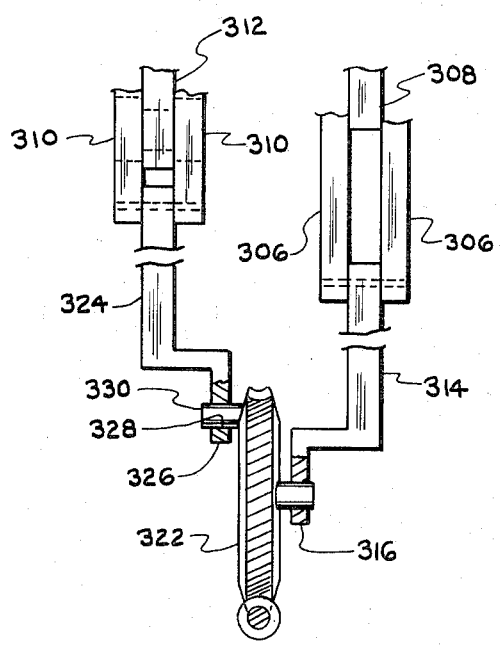
FIG. 13 is a schematic side view in elevation of the mechanism of FIG. 12.

The invention is not limited to a vertically disposed frame nor one in which the movement of the conveyor and workpieces is lineal. An embodiment of the invention in which the frame is horizontally disposed above the conveyor and the workpieces move in an arcuate path is schematically shown in FIGS. 11–13. In this instance, the conveyor is in the form of a turntable 282 which rotates to move workpieces or discs 284 in a circular path. The workpieces can be loaded on the turntable at a station indicated at 286 and unloaded at a station indicated at 288, being coated as they move counterclockwise in a circular path therebetween. A frame 290 is horizontally disposed above a portion of the turntable 282, above a portion of the arcuate path of the workpieces 284. The frame 290 has two longer frame members 292 and 294 and two shorter frame members 296 and 298. An elongate supporting member 300 extends between the two frames 292 and 294, moving transversely in a path parallel thereto. The movement of the elongate supporting member 300 can be termed the X motion. A longer elongate supporting member 302 extends between the frame members 296 and 298, moving transversely in a path parallel thereto. The movement of the supporting member 302 can be termed the Y motion.

A carriage 304 is slidably located at the crossing portions of the elongate supporting members and carries a spray head therebelow which, in this instance, has a spray pattern which can cover the workpiece 284 without any movement of the spray head relative to the workpiece. Consequently, in this instance, it is not necessary to manipulate the spray head relative to the workpiece but only to maintain the spray head and the carriage 304 in an arcuate path synchronized with the workpiece 284 to coat it as it moves through part of its arcuate path between the loading and unloading stations 286 and 288.

The elongate supporting member 300 is moved by mechanism similar to that of FIGS. 2 and 3, with a similar flexible cable having a core controlled by pinions, similar to the pinions 182 and 184 of the mechanism 170, and racks of a similar nature, which are shown in FIG. 13. Here, racks 306 correspond to the racks 196 and a rack 308 corresponds to the rack 198. The core of the flexible cable is operated through the racks 306 and 308 for the X-designated motion of the member 300. The elongate supporting member 302 is similarly operated through mechanisms similar to that of FIGS. 2 and 3, with the core connected to pinions which correspond to the pinions 182 and 184 of the mechanism 172. These mesh with racks 310 and 312 corresponding to the racks 196 and 198 of the mechanism 172. Movement of these racks cause the pinions to move in a manner to impart the Y-designated motion to the elongate supporting member 302.

In this instance, in order to impart the arcuate motion to the carriage 304 to coordinate it with the arcuate path of the workpieces 284, both the racks 306 for the X motion and the racks 310 for the Y motion must be controlled in coordination with the conveyor, in the same general manner that the racks 196 of the mechanism 170 for the X motion of the member 54 is controlled. In this instance, the racks 306 are connected by a link 314 and a lower arm 316 having a slot 318 (FIG. 12) to a pin 320 extending from a rotatable worm gear 322. When the worm gear makes one complete revolution, the racks 306 are moved down and up a distance equal to twice the distance the pin 320 is spaced from the center of the gear. The gear racks 310 have a link 324 connected thereto with a lower arm 326 having a slot 328 therein in which a pin 330 is received. When the worm gear completes one revolution, the racks 310 are similarly moved down and up a distance equal to twice the distance the pin 330 is spaced from the center of the worm gear.

With the pins 320 and 330 offset at 90° angles, as shown in FIG. 12, the racks 306 and 310 are operated in a manner to move the carriage 304 in a circular path. However, since the worm gear 322 is not driven through a complete revolution, it moves the carriage 304 in an arcuate path starting approximately in the lower right hand corner of the frame 290, as viewed in FIG. 11, and ending in the lower left hand corner of the frame. At this time, the carriage 304 is rapidly traversed back in the arcuate path to the starting point, ready for the next workpiece 284 which has been loaded at the station 286.

The worm gear 322 is driven by a worm 322 to drive the worm gear at a speed corresponding to that of the turntable 282. A shaft 334 is connected to the worm 332 and is also connected to an air motor 336; a commercially available, one-way clutch 338 is also mounted on the shaft 334. A worm gear 340 is mounted on the clutch 338 and is driven by a worm 342 which receives its motion from the turntable 282 through a flexible cable or the like in a manner similar to that shown in FIG. 1. This mechanism including the clutch also operates similarly to that of FIG. 9. The worm gear 340 rotates on the clutch 338 at a speed commensurate with that of the turntable but the motion is not imparted to the shaft 334 because of the design of the one-way clutch. However, the air motor 336 drives the shaft 334 and the worm 332 at a speed limited by the speed of the worm gear 340 and the turntable. When the air motor is reversed, it then rotates the shaft 334 rapidly in the opposite direction, not being restricted by the gear 340, to return the carriage 304 back to the starting position ready for another workpiece. The motor 336 can be operated by a four-way valve and by limit switches located at appropriate positions relative to the workpieces 284 entering the area under the frame 290 and exiting the same area. It will be understood that if the workpieces 284 are larger relative to the spray gun carried by the carriage 304, the movable racks 308 and 312 can be given separate independent motions through cams or the like in the manner achieved with the components of the control cabinet 162.

Various modifications of the above described embodiments of the invention will be apparent to those skilled in the art and it is to be understood that such modifications can be made without departing from the scope of the invention, if they are within the spirit and the tenor of the accompanying claims.

I claim:

1. Apparatus for manipulating an object comprising a rectangular frame, a first elongate supporting member extending between a first pair of spaced frame members, a second elongate supporting member extending between a second pair of spaced frame members and crossing said first elongate member, carriage means slidably mounted on crossing portions of both of said elongate supporting members and adapted to carry the object, first moving means carried by one of said first pair of frame members for moving said first elongate supporting member back and forth in directions parallel to said first pair of frame members, said first moving means including a first set of two pinion gears of different diameters rotatably carried by said first elongate supporting member, a first stationary gear rack and a first movable gear rack meshing with said pinion gears, second moving means carried by one of said second pair of frame members for moving said second elongate supporting member back and forth in directions parallel to said second pair of frame members, said second moving means including a second set of two pinion gears of different diameters rotatably carried by said second elongate supporting member, a second stationary gear rack and a second movable gear rack meshing with said second set of two pinion gears, and means for moving said movable gear racks back and forth through lineal motions.

2. Apparatus according to claim 1 characterized by said first moving means further comprises a third set of two pinion gears rotatably carried by said first elongate supporting member, a third stationary gear rack and a third movable gear rack meshing with said third set of two pinion gears, said second moving means further comprising a fourth set of two pinion gears rotatably carried by said second elongate supporting member, a fourth stationary gear rack and a fourth movable gear rack meshing with said fourth set of two pinion gears, means associated with said movable gear rack-moving means for moving said third movable gear rack through the same motions as said first movable gear rack, and means associated with said movable gear rack-moving means for moving said fourth movable gear rack through the same motions as said second movable gear rack.

3. Apparatus according to claim 1 characterized by said means for moving said movable gear racks comprises fluid-operated means.

4. Apparatus according to claim 2 characterized by each of said two means associated with said movable gear rack-moving means comprises fluid-operated means.

5. Apparatus according to claim 3 characterized by said fluid-operated means comprises a fluid-operated cylinder connected to each of said first and second movable gear racks, and a valve for each of said fluid-operated cylinders.

6. Apparatus according to claim 5 characterized by each of said valves having a spool therein, and a flexible cable comprising a sheath and a core, said sheath being connected to said spool and said core being connected to the corresponding movable gear rack.

7. Apparatus according to claim 4 characterized by said fluid-operated means comprises a fluid-operated cylinder connected to each of said third and fourth movable gear racks.

8. Apparatus according to claim 2 characterized by said means for moving said movable gear racks comprises a fluid-operated cylinder connected to each of said first and second movable gear racks, said means associated with said movable gear rack-moving means comprises a fluid-operated cylinder connected to each of said third and fourth movable gear racks, a valve for controlling the fluid-operated cylinders for said first and third movable gear racks, and a valve for controlling the fluid-operated cylinders for said second and fourth movable gear racks.

9. Apparatus according to claim 8 characterized by each of said valves having a spool therein, and a flexible cable comprising a sheath and a core for each of said valves, said sheaths being connected to said spools and said cores being connected to one of said first and third movable gear racks and one of said second and fourth movable gear racks, respectively.

10. Apparatus for manipulating a tool for performing operations on products carried along a conveyor, said apparatus comprising a pair of spaced, parallel frame members adapted to be disposed in a plane parallel to the path of movement of the products along the conveyor, a second pair of spaced, parallel frame members located transversely to the first pair of frame members, a first elongate supporting member extending between said first pair of frame members, a second elongate supporting member extending between the second pair of frame members and crossing said first elongate member, carriage means slidably mounted on crossing portions of both of said elongate supporting members and adapted to carry the tool, first means for moving said first elongate supporting member back and forth in a direction parallel to said first pair of frame members, second means for moving said second elongate supporting member back and forth in a direction parallel to said second pair of frame members, and control means for controlling said first and second moving means to move said first and second elongate supporting members through predetermined motions to control the movement of said carriage means in a predetermined pattern, said control means including means for influencing the movement of said first elongate supporting member in one direction in response to the movement of the products on the conveyor.

11. Apparatus according to claim 10 characterized by the products being carried along the conveyor in a lineal path, and said first pair of spaced, parallel frame members are adapted to be disposed parallel to the path of movement of the products along the conveyor, and said second pair of spaced, parallel frame members are located perpendicular to the first pair of frame members.

12. Apparatus according to claim 10 characterized by the products being carried along the conveyor in an arcuate path, with both pairs of parallel frame members lying in a plane parallel to the arcuate path, and said control means effecting the movement of both of said elongate supporting members in response to the movement of the products on the conveyor.

13. Apparatus according to claim 10 characterized by said first moving means comprises a first set of two pinion gears rotatably carried by said first elongate supporting member, a first set of gear racks including a stationary rack and a movable rack meshing with said first set of pinion gears, said second moving means comprising a second set of pinion gears rotatably carried by said second elongate supporting member, a second set of gear racks including a stationary gear rack and a movable gear rack meshing with said second set of pinion gears, and said control means controls movement of both of said movable gear racks.

14. Apparatus according to claim 13 characterized by said control means includes a flexible cable connected with each of said movable gear racks.

15. Apparatus according to claim 14 characterized further by fluid-operated means connected with each of said movable gear racks.

16. Apparatus according to claim 15 characterized by said fluid-operated means comprises a fluid-operated cylinder having a piston rod connected to each of said movable gear racks, and a valve for controlling fluid to each of said cylinders, each of said valves being controlled by a corresponding one of said flexible cables.

17. Apparatus according to claim 16 characterized by said valves include spools therein, said flexible cables having sheaths and cores, said cores being connected to said movable gear racks and said sheaths being connected to said spools.

18. Apparatus according to claim 10 characterized by said influencing means of said control means comprises means for moving said first elongate supporting member in a direction opposite the one direction independently of other movement of said first elongate supporting member by said control means.

19. Apparatus for manipulating an object in a pattern comprising frame members defining an opening, a first elongate supporting member extending between a first pair of spaced frame members, a second elongate supporting member extending between a second pair of spaced frame members, said elongate supporting members crossing one another at an angle, carriage means movably mounted on crossing portions of both of said elongate supporting members, first moving means carried by one of said first pair of frame members for moving said first elongate supporting member back and forth in directions parallel to said first pair of frame members, second moving means carried by one of said second pair of frame members for moving said second elongate supporting member back and forth in directions parallel to said second pair of frame members, a first flexible cable comprising a first flexible sheath and a first flexible core which is substantially incompressible in a longitudinal direction, said core being connected to said first moving means, a second flexible cable comprising a second flexible sheath and a second flexible core which is substantially incompressible in a longitudinal direction, said second core being connected to said second moving means, first control means for moving said first core longitudinally, and second control means for moving said second core longitudinally.

20. Apparatus according to claim 19 characterized by each of said control means comprises a first pinion gear and a second pinion gear connected to the first pinion gear in co-axial relationship, said pinion gears being connected to the corresponding core, a movable gear rack meshing with the first pinion gear, a stationary gear rack meshing with the second pinion gear, and means for moving the movable gear rack through lineal motions.

21. Apparatus according to claim 20 characterized further by said last-named means comprises cam means and follower means.

22. Apparatus according to claim 21 characterized by drive means for rotating said cam means and for varying the speed of rotation of same.

23. Apparatus according to claim 20 characterized by additional means for moving one of said stationary gear racks in one direction at a constant rate, at predetermined times.

24. Apparatus according to claim 23 characterized by a conveyor, and means for coordinating said additional moving means with the rate of movement of the conveyor.

25. Apparatus according to claim 23 characterized by means for returning said one stationary gear rack to its original position at a rate faster than it is moved by said additional moving means in the one direction.

26. Apparatus according to claim 25 characterized by said last-named means comprises an air-driven motor.

27. Apparatus according to claim 24 characterized by means for returning said stationary rack to its original position, and said coordinating means further comprises a one-way clutch connected between said return means and said stationary rack.

28. Apparatus for manipulating a tool relative to products carried along a conveyor, said apparatus comprising a pair of spaced, parallel frame members adapted to be disposed in a plane parallel to the path of movement of the products along the conveyor, an elongate supporting member extending between said pair of frame members, carriage means mounted on said elongate supporting member and adapted to carry the tool, two pinion gears of different diameters rotatably carried by said elongate supporting member and connected together, a stationary gear rack and a movable gear rack meshing with said pinion gears and supported by one of said frame members, and means for moving said movable gear rack through predetermined lineal motions for moving said elongate supporting member back and forth in directions parallel to said pair of frame members.

29. Apparatus according to claim 28 characterized by said movable gear rack meshing with the smaller pinion gear and said stationary gear rack meshing with the larger pinion gear.

30. Apparatus according to claim 28 characterized by said moving means comprises a flexible cable having a sheath and having a core affixed to said movable gear rack, and remote means connected to said core and adapted to move same.

31. Apparatus according to claim 30 characterized by means connected with said conveyor and connected with said core-moving means for influencing movement of said core relative to movement of products on the conveyor.

32. Apparatus according to claim 30 characterized by said core-moving means comprises a rotatable cam of predetermined shape for moving the core through predetermined patterns.

33. Apparatus according to claim 32 characterized by means for influencing movement of the core in accordance with the movement of products along the conveyor independently of said cam.

34. Apparatus according to claim 30 characterized by said core-moving means comprises a stationary control rack and a movable control rack, means for moving said movable control rack back and forth through predetermined motions, and means for moving said stationary control rack in accordance with movement of products on the conveyor and independent of movement of said movable control rack.

* * * * *